United States Patent [19]

Pellhammer

[11] 4,140,214
[45] Feb. 20, 1979

[54] DELIVERY DEVICE FOR A CONTAINER OF BULK MATERIAL

[75] Inventor: Maurus Pellhammer, Ravensburg, Fed. Rep. of Germany

[73] Assignee: Sulzer Brothers Limited, Winterthur, Switzerland

[21] Appl. No.: 786,567

[22] Filed: Apr. 11, 1977

[30] Foreign Application Priority Data

Apr. 15, 1976 [CH] Switzerland .................. 4836/76

[51] Int. Cl.² ........................................... B65G 65/46
[52] U.S. Cl. ................................. 198/551; 198/558; 198/616; 198/663; 198/669; 214/17 D; 222/238; 222/272
[58] Field of Search ............... 198/548, 551, 552, 557, 198/558, 559, 616, 663, 669; 222/238, 265, 272, 412, 413; 214/17 D

[56] References Cited

U.S. PATENT DOCUMENTS

| 993,294 | 5/1911 | Edison | 214/17 D |
|---|---|---|---|
| 1,401,155 | 12/1921 | Jacoby | 198/558 X |
| 2,754,996 | 7/1956 | Heltzel | 222/413 X |
| 3,201,005 | 8/1965 | Buhr et al. | 222/272 |
| 3,428,196 | 2/1969 | Eaves | 214/17 D |

Primary Examiner—Robert B. Reeves
Assistant Examiner—James L. Rowland
Attorney, Agent, or Firm—Kenyon & Kenyon, Reilly, Carr & Chapin

[57] ABSTRACT

At least one pair of vertically superimposed conveyors are located in the bottom region of a bunker in order to discharge the bulk material. The conveyors are spaced apart to create a void or at least a loosened zone free from horizontal pressures in the bulk material between the conveyors. The void prevents the bulk material from bridging over so that gravity flow is not impeded.

8 Claims, 6 Drawing Figures

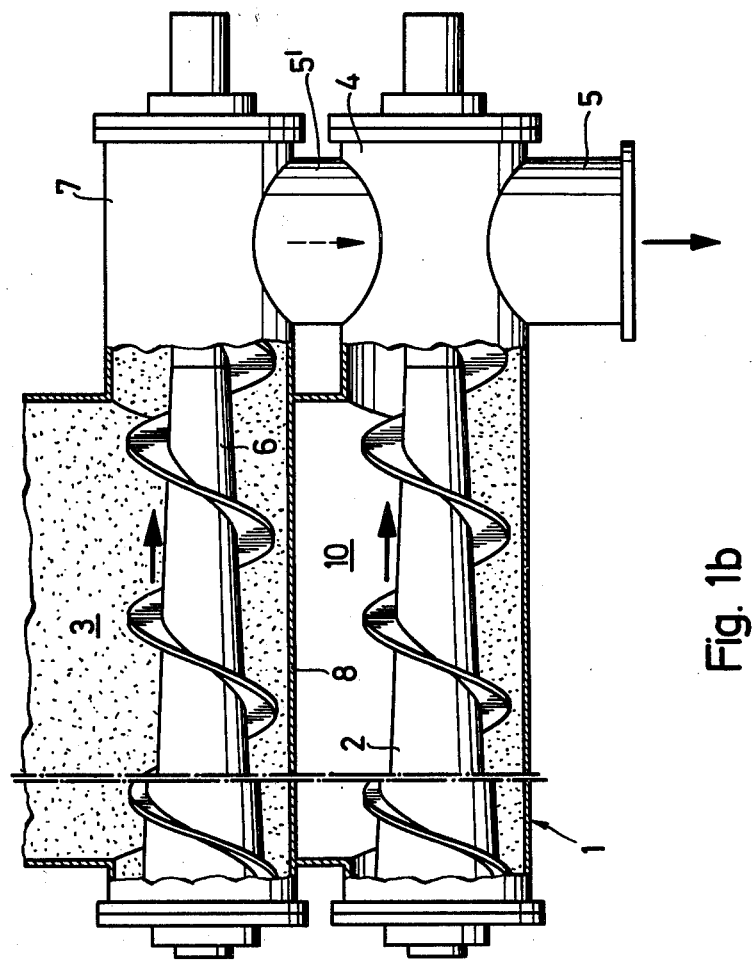
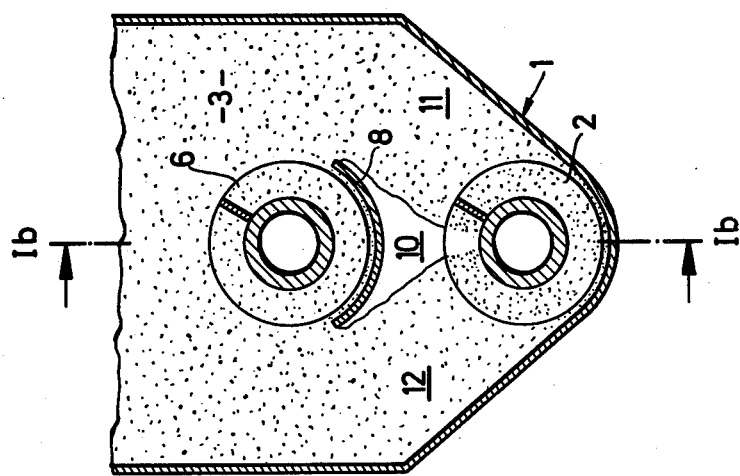
Fig. 1b
Fig. 1a

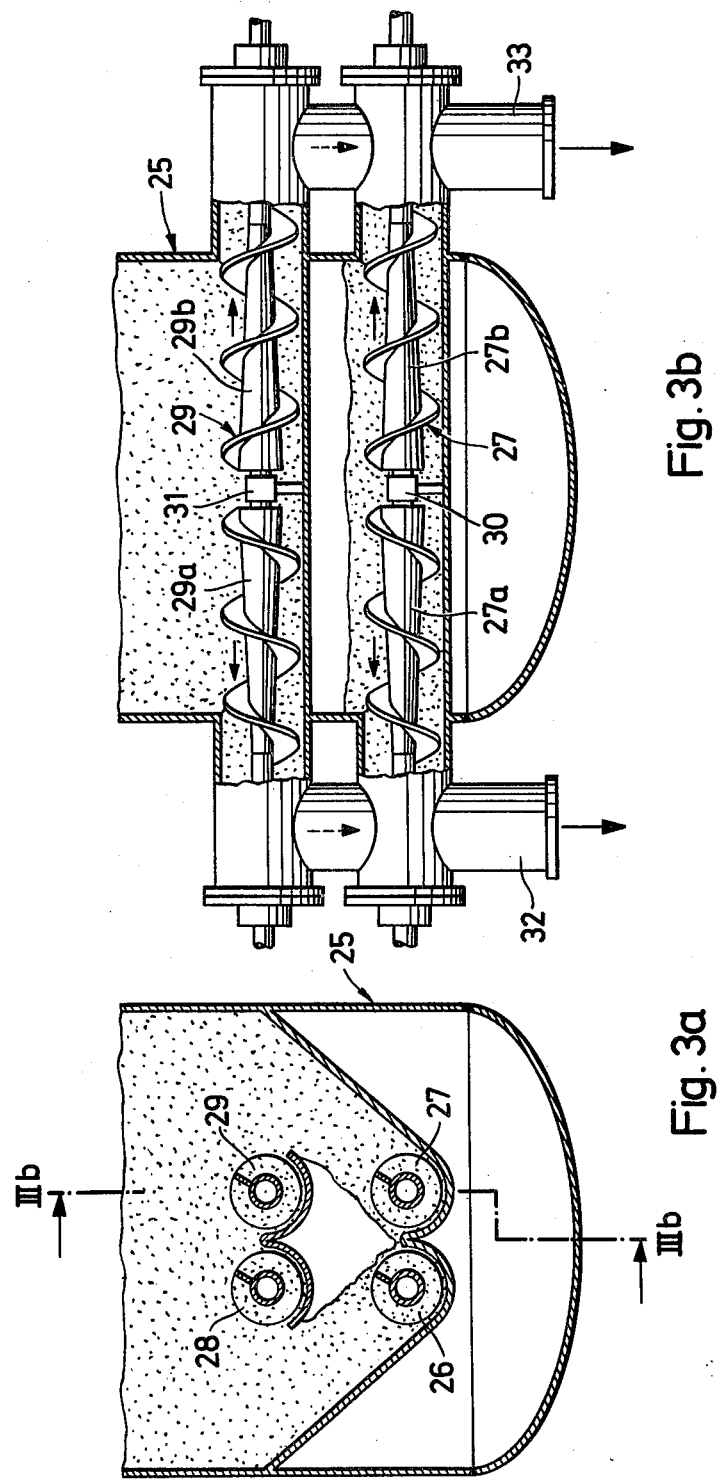

DELIVERY DEVICE FOR A CONTAINER OF BULK MATERIAL

This invention relates to a device for a container of bulk material.

As is known, when bulk material or bulk goods are placed in a container of columnar form such as a bunker, the particles of material which are disposed one above another become compacted under their own weight. When the amounts of material are considerable and the columns are very high, particle compacting may reach an extent such that gravity delivery alone through a delivery aperture of the bunker becomes impossible. This is due to the fact that the vertical stresses in the bulk material and the angle of friction of the material with the bunker walls produce horizontal stresses in the material which cause the discrete particles of the material to key and wedge together. As a result, in many kinds of bulk material, particularly when wet, substantially horizontal bridges and cones may occur which become more dimensionally stable in proportion as the height of the material in the column increases. Generally, it is difficult to break up these bridges and cones. Further, these bridges and cones impede gravity flow of the material and, particularly, make metered delivery of the material impossible not to mention uniform delivery over the whole bunker cross-section.

It has been known to provide a delivery device which employs a screw conveyor for delivering bulk material with a rotating agitator or scraper above the screw conveyor in order to loosen the bulk material above the conveyor. However, a disadvantage of this type of construction is that the rotating agitator or scraper cannot reliably break up bridges and cones in the delivery path. As a result, such a delivery device cannot ensure 100% continuous gravity flow and uniform delivery of bulk material over the whole bunker cross-section.

Accordingly, it is an object of the invention to provide a delivery device for a bunker which permits gravity flow of the bulk material without hinderance.

It is another object of the invention to provide a delivery device for a bunker which allows a controlled delivery of bulk material over the whole bunker delivery cross-section.

Briefly, the invention provides a delivery device for a container of bulk material which comprises at least one conveyor which extends transversely to a direction of descent of the bulk material for delivering the bulk material and at least one additional conveyor upstream of the first conveyor relative to the direction of descent of the bulk material for also delivering the bulk material.

The delivery device is located in the lower region of the container which is in the form of a bunker and the two conveyors are spaced in parallel to one another to define a void therebetween for a free flow of bulk material therein.

The delivery device not only prevents the formation of horizontal bridges and cones in the bulk material, but also allows the second conveyor to participate in the delivery of the bulk material. As a result, less conveyor capacity is required in the bottom region of the bunker. Also, where the conveyors are made as screw conveyors, the reduction in the bunker cross section in the bottom region due to the need for apertures for the screw conveyors can be minimized. This is an important factor particularly for pressurized bunkers since the construction of the bunker can be kept simple.

If material is to be delivered on both sides of the bunker, the conveyors can be composed of two oppositely conveying parts for conveying the bulk material to opposite sides of the bunker. In this case, the superposed parts of the respective conveyors direct the bulky material in the same delivery direction.

These and other objects and advantages of the invention will become more apparent from the following detailed description and appended claims taken in conjunction with the accompanying drawings in which:

FIG. 1a illustrates a longitudinal sectional view through the delivery region of a bunker with a delivery device according to the invention;

FIG. 1b illustrates a view taken on line Ib—Ib of FIG. 1a;

FIG. 2b illustrates a view take on line IIb—IIb of FIG. 2a;

FIG. 3a illustrates a longitudinal sectional view of a bunker having a further modified delivery device according to the invention; and FIG. 3b illustrates a view taken on line IIIb—IIIb of FIG. 3a.

Figure 2B:
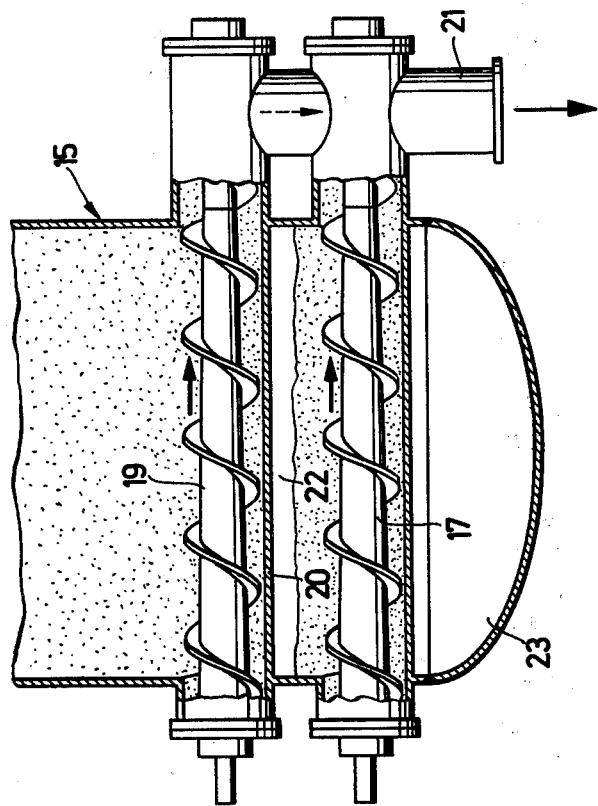

Referring to FIGS. 1a and 1b, a container in the form of a vertically disposed bunker 1 for housing a column of bulk material 3 employs a delivery device in a tapering lower or bottom region thereof. The delivery device includes a screw conveyor 2 which extends across the tapering lower region of the bunker 1 for delivering bulk material from the bunker 1. As shown in FIG. 1b, the conveyor 2 delivers the bulk material continuously into a discharge means in the form of a delivery pipe 4 which is located at the sides of the bunker 1 and discharges into a header or collector pipe 5. In addition, the delivery device employs a second screw conveyor 6 for delivering the bulk material from the bunker 1. As shown, this second conveyor 6 is spaced above and in parallel to the lower conveyor 2 above the tapering lower region of the bunker 1 in order to define a void 10 therebetween for a free flow of bulk material therein. As shown in FIG. 1b, the screw conveyor 6 continuously delivers the bulk material to a delivery pipe 7 at the side of the bunker 1. This delivery pipe 7 is connected by way of a short tubular member 5' to the delivery pipe 4. Thus, the bulk material delivered by the two conveyors 2, 6 leaves the bunker 1 through the collector pipe 5.

Referring to FIG. 1a, a metal plate 8 extends around and below the screw conveyor 6 in order to prevent bulk material from dropping out of the conveyor 6.

The screw conveyor 6 is positioned at a point above the screw conveyor 2 so as to effect a void 10 or at least a loosened zone in the material 3 free from horizontal pressures. This ensures that any bridges and cones which may have formed in the material 3 break up since the horizontal stresses in the material 3 are continuously being decreased in this region. The bulk material 3 therefore moves substantially in two component streams 11, 12 towards the lower conveyor 2 for delivery. These component streams 11, 12 can, in known manner, slide over one or more inclined planes projecting from the wall of the delivery region of the bunker 1.

During operation, the conveyors 2, 6 are driven by a motor (not shown) outside the bunker 1 so that the material 3 in the bottom region of the bulk container 1 is delivered uniformly over the whole bunker delivery cross-section under gravity flow to one side of the bunker 1. In this regard, the respective delivery pipes 4, 7 are in communication with the respective conveyors 2, 6 so as to receive the bulk material and the collector pipe 5 and tubular member 5' are also in communication with the respective delivery pipes 4, 7 so as to discharge the bulk material.

Figure 2A:
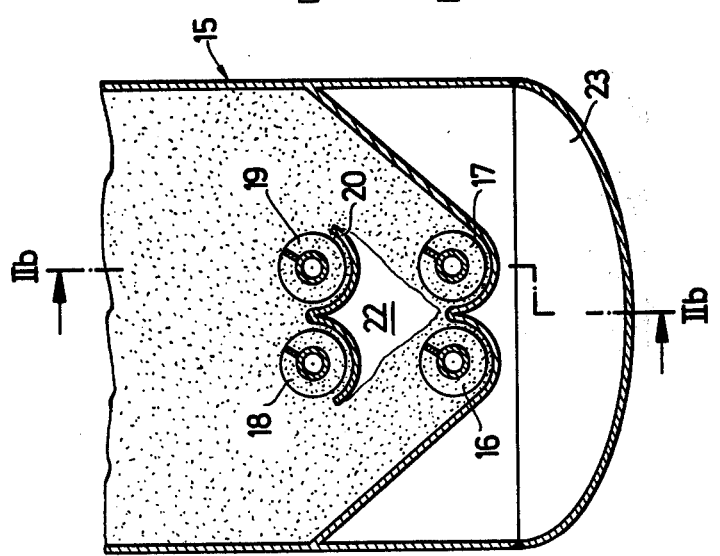
FIG. 2a illustrates a longitudinal sectional view of a bottom region of a bunker having a modified delivery device according to the invention.

Referring to FIGS. 2a and 2b, a bunker 15 may be provided with a delivery device which includes two pairs of conveyors such as screw conveyors 16–19 which are disposed in parallel overlying spaced relation. As shown, the pairs of conveyors 16–19 define a void 22 or a zone in which the bulk material would be free of horizontal pressures therebetween. In addition, a guide plate 20 is disposed below the two top conveyors 18, 19 in order to prevent bulk material from dropping through to the bottom conveyors 16, 17.

As shown in FIG. 2b, the four screw conveyors 16–19 deliver in the same direction and convey the bulk material to a discharge means such as a collecting pipe 21 for discharge from the bunker. This delivery device operates in the same way as that described with respect to FIGS. 1a and 1b.

As shown, a pressure equalizing vessel 23 may extend around the bunker delivery region 15 in order to reduce pressure on the walls of the bunker.

Referring to FIGS. 3a and 3b, bunker may be provided in the bunker delivery zone 25 with pairs of overlying conveyors wherein each conveyor 26–29 is composed of two oppositely conveying parts a, b for conveying bulk material to opposite sides of the bunker. As shown in FIG. 3b, the conveyors are centrally mounted by means of intermediate bearings 30, 31 with the respective conveyor half-parts 27a, 27b, for example, conveying the bulk material to the opposite sides of the bunker. Each of the conveyor half-parts 26a–29a communicates with a common discharge means in the form of a collecting pipe 32 while the conveyor half-parts 26b–29b communicate with a common discharge means in the form of a collecting pipe 33. The effect of the screw conveyors 26–29 is the same as described above. Also, a guide plate, as above, is disposed below and around the upper conveyors 28, 29 to prevent bulk material from dropping to the bottom conveyors 26, 27.

As illustrated, the various screw conveyors are shown as having a screw volume which increases in the conveyor direction. However, the screw conveyors may also have screws with pitches which increase in the conveying direction. Also, both types can be combined.

It is further noted that instead of using screw conveyors to convey the bulk material, other forms of conveyors can, of course, be used such as plate, chain, vibrating and scraping conveyors.

What is claimed:

1. In combination with a vertically disposed bunker for bulk material, said bunker having a tapering lower region, a delivery device in said lower region of said bunker for delivering the bulk material from said bunker, said delivery device including at least one conveyor extending across said lower region of said bunker for delivering bulk material from said bunker, a second conveyor for delivering bulk material from said bunker, said second conveyor being spaced above and in parallel to said one conveyor above said lower region to define a void therebetween for a free flow of bulk material therein and a plate around and below said second conveyor to prevent bulk material from dropping out of said second conveyor.

2. The combination as set forth in claim 1 wherein said delivery device further includes a first delivery pipe in communication with said one conveyor to receive bulk material therefrom, a collector pipe in communication with said delivery pipe to receive bulk material therefrom, and a second delivery pipe in communication with said second conveyor to receive bulk material therefrom and in communication with said first delivery pipe of discharge bulk material thereto.

3. The combination as set forth in claim 1 wherein said delivery device includes two pairs of said conveyors disposed in parallel overlying spaced relation.

4. The combination as set forth in claim 3 wherein said conveyors are screw conveyors and wherein said delivery device includes a plate below the upper pair of said conveyors to prevent bulk material from dropping out of said upper pair of conveyors.

5. The combination as set forth in claim 4 wherein each said conveyor is composed of two oppositely conveying parts for conveying bulk material to opposite sides of said bunker and wherein said delivery device further includes a discharge means at an end of each said part for discharging the delivered bulk material from said bunker.

6. The combination as set forth in claim 5 wherein each discharge means includes a vertically disposed delivery pipe in communication with a respective conveying part.

7. The combination as set forth in claim 1 wherein said conveyors are screw conveyors.

8. In combination,
   a container for bulk material, said container having a tapering lower portion in the direction of descent of the material;
   at least one conveyor in said tapering portion extending transversely to the direction of descent of the material for delivering the material to a side of said container;
   at least one additional conveyor vertically above and in parallel to said one conveyor relative to the direction of descent of the material for delivering the material to a side of said container, said additional conveyor being located with an axis of rotation above said lower portion and facing the descending material; and
   a plate below said additional conveyor to prevent the material from dropping out.

* * * * *